Dec. 22, 1931. J. J. M. ELIAS 1,837,610
CLEANING MACHINE
Filed Oct. 6, 1928 3 Sheets-Sheet 3
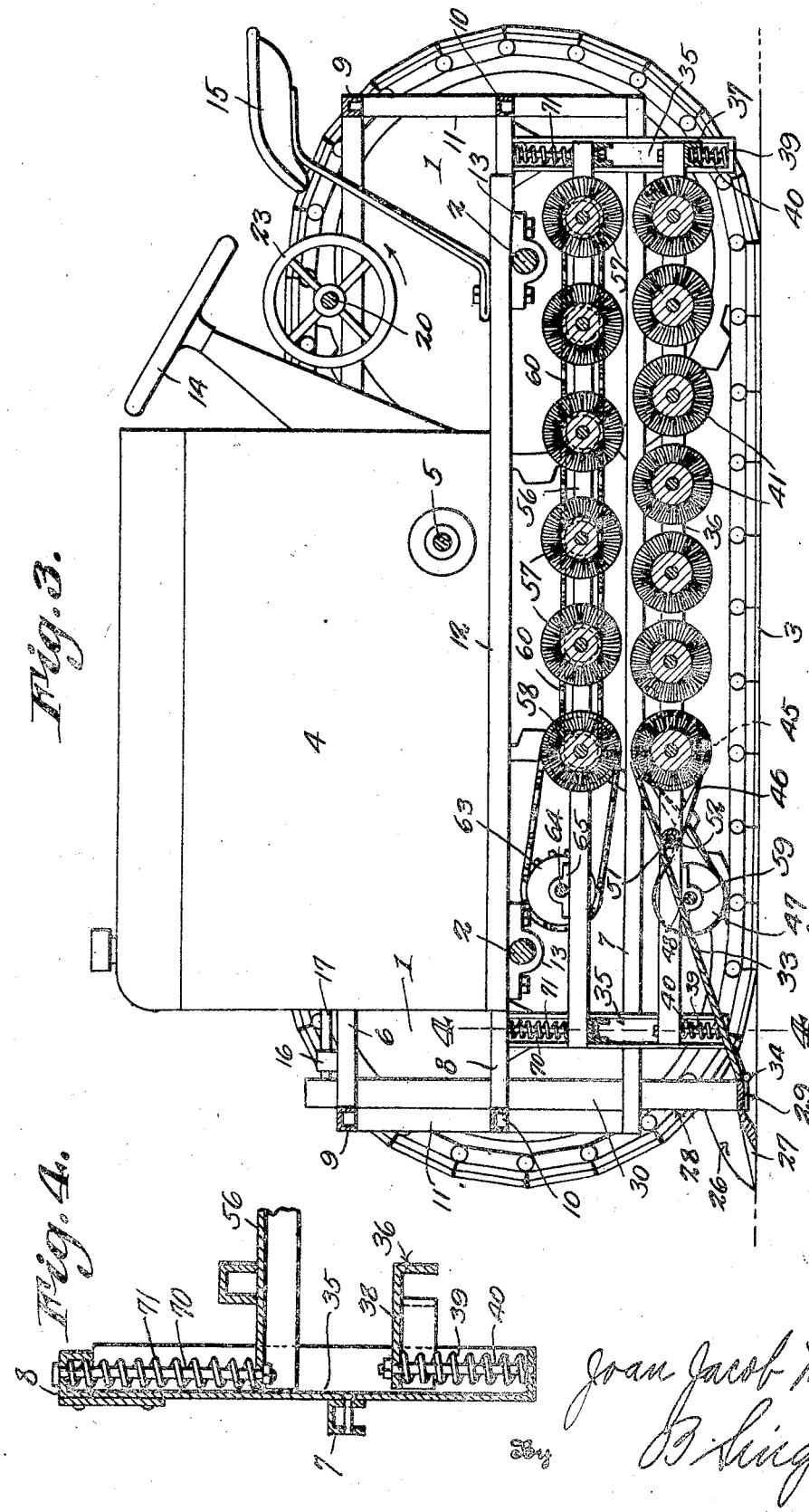

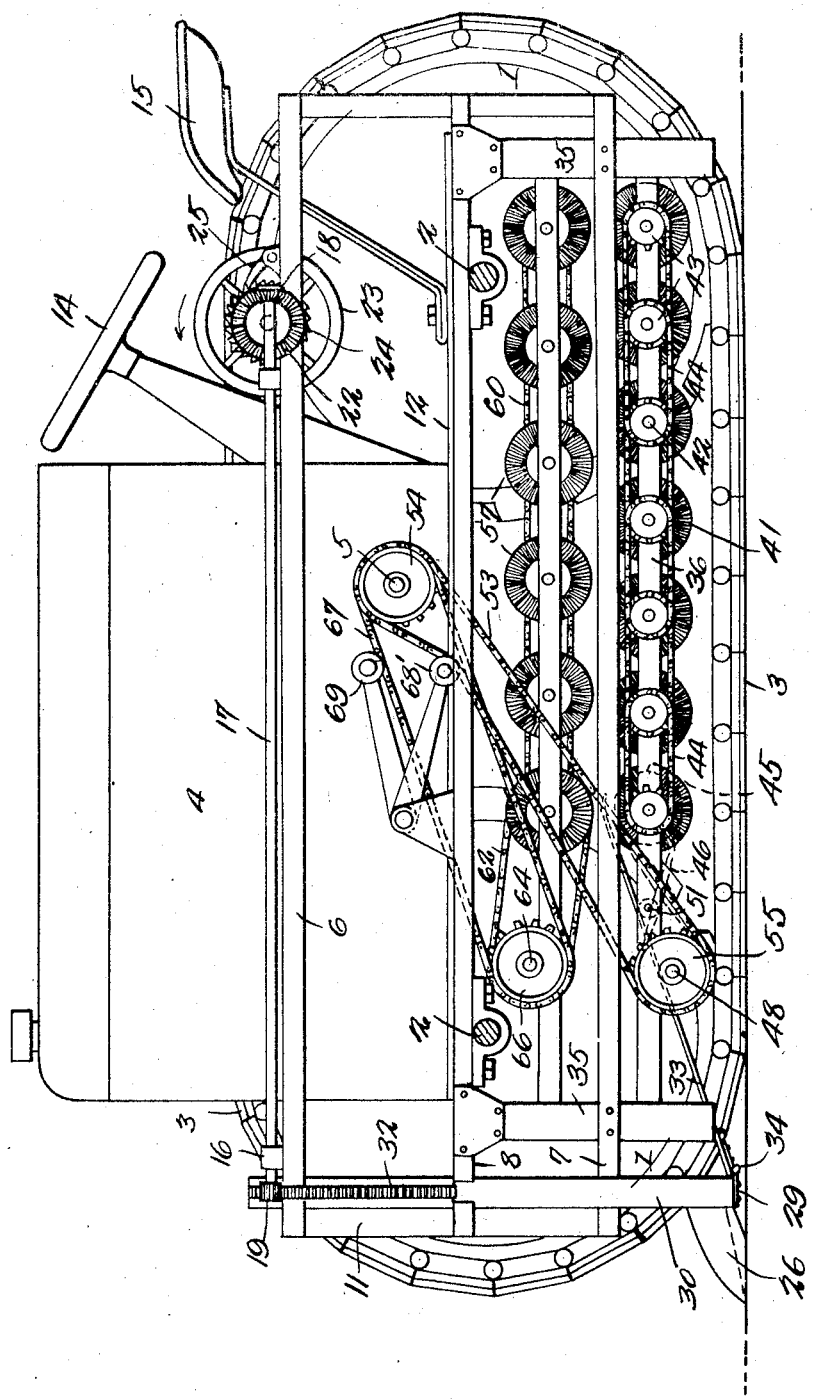

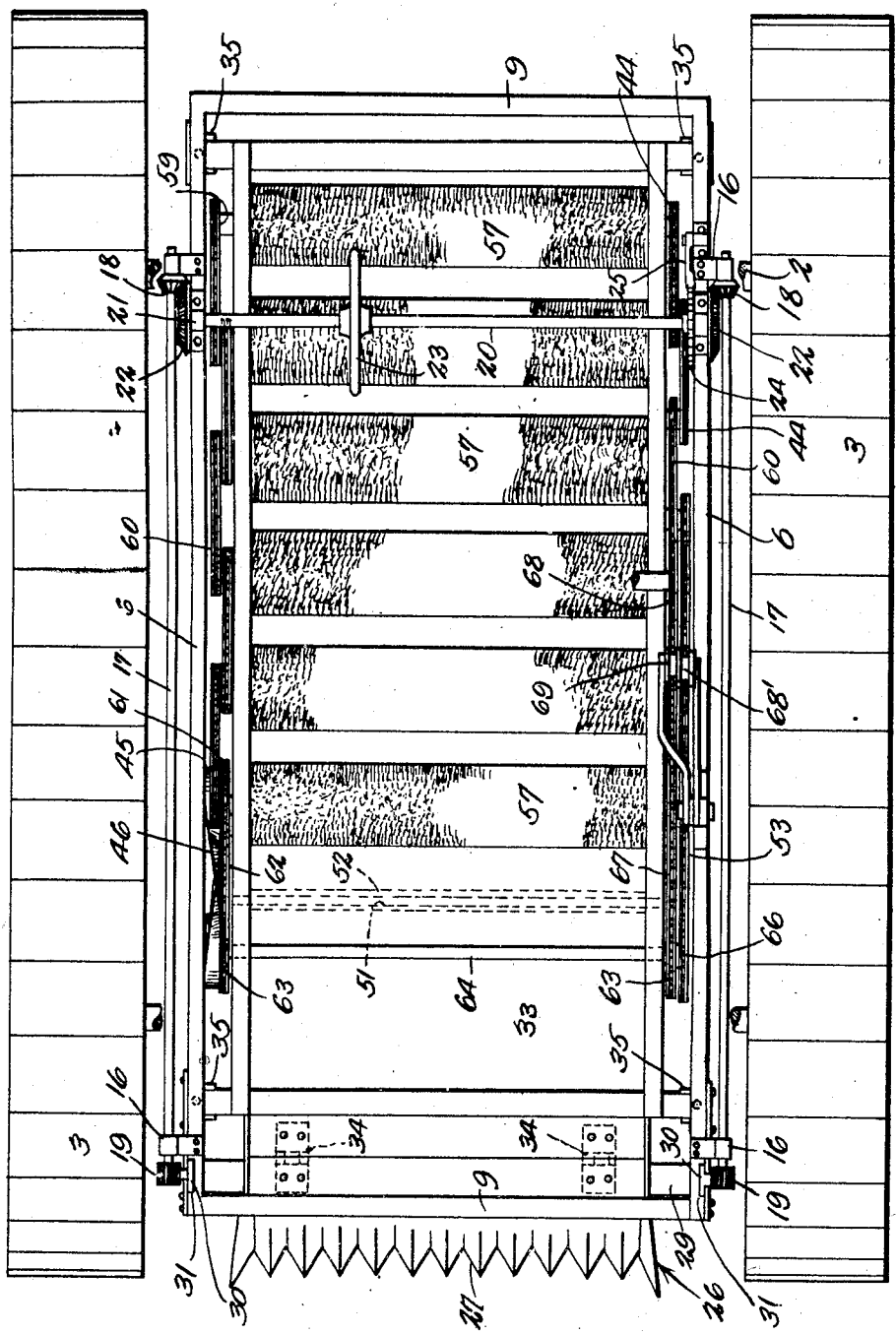

Patented Dec. 22, 1931

1,837,610

UNITED STATES PATENT OFFICE

JOAN JACOB MARI ELIAS, OF WASSENAAR, NEAR THE HAGUE, NETHERLANDS

CLEANING MACHINE

Application filed October 6, 1928. Serial No. 310,842.

This invention relates to improvements in cleaning machines for use in cleaning harvested or dug crops lying on the ground, such as sugar cane, beets, potatoes and other agricultural products, the objects of the invention being to provide an improved cleaning machine of this class which is simple in construction, exceedingly strong and durable, which can be manufactured at minimum cost and by means of which large quantities of harvested or dug crops of the kinds specified may be readily cleaned from dirt, leaves and rubbish and in an exceedingly short space of time and almost entirely without manual labor.

Another object of the invention is to provide an improved machine of this kind which can be mounted on a tractor so that it can be operated by the tractor and cause to clean a harvested or dug up crop lying on the ground by driving the same across the field and along the rows in which the harvested or dug up crops have been disposed in the harvesting or digging up processes.

With the above and other objects in view, the invention consists in the construction, combination and arrangement of devices hereinafter described and claimed.

In the accompanying drawings

Figure 1 is an elevation of a cleaning machine constructed and arranged in accordance with my invention, with the near wheels and tractor element removed and with the axles in cross section.

Figure 2 is a plan of the same with the axles partly broken away to disclose subjacent mechanism.

Figure 3 is a vertical longitudinal sectional view of the same.

Figure 4 is a detail transverse sectional view of the same on the plane indicated by the line 4—4 of Figure 3.

The wheels of a tractor are indicated at 1, the axles at 2, the endless tractor elements which connect the front and rear wheels are indicated at 3 and the motor is indicated at 4, the driving shaft of the motor being indicated at 5. The tractor frame may be of any suitable construction and is here shown as comprising upper longitudinal bars 6, lower longitudinal bars 7, intermediate longitudinal bars 8, cross bars 9 connecting the ends of the bars 6, cross bars 10 connecting the ends of the bars 8, and vertical corner bars 11 to which the ends of said longitudinal bars are secured. All the bars of the frame are of structural steel, preferably channel bars.

The platform 12 of the frame is intermediate the sides thereof and bearings 13 are provided for the axle shafts 2. The steering wheel is indicated at 14 and the driver's seat at 15.

In accordance with my invention, I also provide bearing brackets 16 which extend outwardly from and are secured on the upper bars 6 and in which the front and rear portions of a pair of longitudinal shafts 17 are mounted. Each of said shafts has a beveled pinion 18 near its rear end and a spur gear 19 at its front end. A transverse, operating shaft 20 is also mounted in bearings 21 which are secured on the upper sides of the bars 6 at points a suitable distance from the rear end of the frame and said shaft is provided with beveled gears 22 which mesh with the pinions 18 and is further provided with a hand wheel 23 so that said shaft may be operated by the driver of the truck. Said shaft is further provided with a ratchet wheel 24 which is engaged by gravity acting pawl 25, said ratchet wheel and pawl being active when the pawl is in the engaged position shown in Figures 1 and 2 to prevent rotation of said shaft excepting in the direction indicated by the arrow in Figure 1.

At the front end of the machine is a gathering or plow element 26 for raising the cut sugar cane or the dug beets, potatoes or the like from the ground and which may be of any suitable construction and is here shown as provided with a front serrated edge 27. The said element 26 is secured to a U-shaped frame 28 which comprises a bottom cross bar 29 and vertical side bars 30, said side bars being arranged for vertical movements in guideways 31 with which the side frames of the machine are provided as shown. Said bars 30 are provided on their outer sides with rack teeth 32 which are engaged by the pinions 19 and hence by turning the shaft 20 and thereby also turning the shaft 17 as will be understood, the gathering element or plow may be raised or lowered, and by then engaging the pawl 25 with the ratchet wheel 24 said gathering element or plow may be fixed and held at any desired vertical adjustment, as will be understood. A guide plane 33 is hinged at its front end to the bar 29 in rear of the gathering element or plow as at 34, said guide plane extending upwardly and rearwardly as here shown.

Secured to the side members of the tractor frame are vertical guide bars 35 which are here shown as channel bars closed at the upper and lower ends and which are arranged near the front and rear ends of the frame.

Associated with the gathering element on the plow and with the plane 33 are lower and upper brushing mechanisms. The lower brushing mechanism comprises a frame 36 which is made of channel bars, is closed at the rear end by a transverse channel bar 37 and is open at the front end to provide an unobstructed throat for the passage therethrough of material raised by the gathering element or plow 26 and the plane 33 by the forward movement of the machine. The ends of the cross bar 37 enter the channels of the rear guide bars 35 so that the frame 36 is vertically movable therein and the front ends of the side members of the frame 36 have outwardly extending arms 38 which are arranged for vertical movement in the channels of the front guide bars 35. The said frame 36 is supported by and bears on coiled extensile springs 39 which are arranged in the channels of the guide bars and bear on the closed lower ends thereof, guiding bolts 40 extending upward from said closed bottoms of the guide bars and passing through the springs 39 and also through openings in the portions or members of the frame 36 which operate in the channels of said guide bars. A suitable number of transversely arranged revoluble brushes 41 have the end portions of their shafts 42 mounted in bearings in the sides of the frame 36, and each of said shafts is provided at its ends with chain wheels 43.

The chain wheels of the said brush shafts are connected together in pairs by endless sprocket chains 44, so that the said brushes are connected together for simultaneous revolution in the same direction. The shaft of the foremost brush is also provided with a pulley 45 which is connected by a closed belt 46 to a similar pulley 47 on a counter shaft 48 which counter shaft is mounted in bearings 59 secured on the under sides of the side members of the frame 36 at a point below the plane 37 and suitably spaced from the front, open end of said frame. A cross shaft 51 connects the side members of said frame 36 and is provided with a roller 52 mounted thereon for rotation, which roller bears under and supports the plane 33 at all adjustments of the plow or gathering element and the plane and also during all vertical movements of the lower roller frame on its supporting and cushioning springs 39. The counter shaft 48 is driven from and by the driving shaft 5 of the motor and is connected thereto by an endless chain 53 and sprocket wheels 54, 55 with which said shafts 5, 48 are respectively provided.

I also provide an upper roller mechanism which comprises a frame 56 which is similar to the frame 36 and is mounted for vertical movements in the guide bars 35, said upper roller mechanism also comprising revoluble brushes 57 which are similar to the lower brushes hereinbefore described and which brushes 57 are also connected together in pairs for simultaneous rotation in the same direction by sprocket wheels 58 and endless sprocket chains 60 as shown. The foremost upper brush 57 has its shaft provided near one end with a sprocket wheel 61 which is connected by an endless sprocket chain 62 to a sprocket wheel 63 provided on a counter shaft 64, which counter shaft is mounted in bearings 65 with which the frame of the upper brushing mechanism is provided. Said counter shaft also has a sprocket wheel 66 which is connected by an endless sprocket chain 67 with a sprocket wheel 68 on the motor shaft 5, so that the brushes of the upper brushing mechanism are also driven by the motor when the latter is in operation.

Gravity operating tighteners 68', 69 respectively bear on the upper leads of the chains 53, 67 to keep the chains tight and the machine in operative position at all times and to compensate for the vertical movements of the frames of the lower and upper brushing mechanisms. The frame of the upper brushing mechanism is suspended from the upper ends of the guide bars 35 by bolts 70 and springs 71 which are similar to the springs 39 hereinbefore described bear on the projecting ends of the cross bars of said upper frame.

It is thought the operation of the machine will be fully understood from the foregoing description. As the machine progresses along a row of harvested cane lying on the ground or of beets, potatoes or the like which have been dug and lie on or near the surface of the ground, the plow or gathering element having been properly adjusted as hereinbefore described picks up said material and the forward motion of the machine causes such material to pass from the plow or gathering element on to the plane and upwardly and rearwardly over the plane and to be delivered in the space between the brushes of the lower and upper brushing mechanisms, which brushes by their rapid rotation and by the staggered relation of the upper brushes to the lower brushes cause such material to be thoroughly brushed and all the adhering earth, leaves, fibers or other trash to be removed therefrom, the brushes acting successively as the material passes rearwardly through the machine, so that by the time the material reaches the rear end of the machine and drops from between the last lower and upper brushes it has been thoroughly cleaned. Owing to the freedom of vertical movement of the frames of the upper and lower brushes and to their being cushioned by the springs, the upper and lower brushes adjust themselves to variations in the quantity and thickness of the material passing between them, as will be understood. The cleaned material may drop either to the ground in such condition or on to a suitable receiving receptacle or vehicle or other device provided therefor.

It will be understood that the wheeled frame which carries the cleaning machine and which is here shown as the frame of a tractor may be other than a tractor frame and may be drawn itself by a tractor or other motive power, in which event its shaft 5 will also be driven by said tractor or other motive power.

While I have herein shown and described a preferred form of my invention, I would have it understood that modifications may be made in the form, proportion and construction of the several parts without departing from the spirit of my invention and within the scope of the appended claims.

Having thus described my invention, what I claim is:

1. In a machine of the class described, an ambulant frame, a series of lower revoluble brushes arranged transversely of the frame, a series of upper revoluble brushes arranged transversely of the frame, each of said series of brushes being arranged in an approximately horizontal plane and each brush of each series having a continuous peripheral brushing surface extending from side to side of the frame, a gathering element arranged in front of and below the lower brushes, a lifting plane to deliver material from said element to a point between the lower and upper brushes and means to rotate said series of brushes respectively in the required directions to cause the material to move rearwardly between said series of brushes while being brushed thereby.

2. A machine as claimed in claim 1, in which frames are provided one for the lower brushes and one for the upper brushes and said frames are mounted for vertical movement to enable the brushes to adjust themselves to vary the quantity of material passing between them.

3. A machine as claimed in claim 1, in which frames are provided one for the lower brushes and one for the upper brushes and said frames are mounted for vertical movement to enable the brushes to adjust themselves to vary the quantity of material passing between them and in which cushioning elements are provided for said brush frames.

In witness whereof I affix my signature.

JOAN JACOB MARI ELIAS.